US012081069B2

(12) United States Patent
Sugaya (10) Patent No.: US 12,081,069 B2
(45) Date of Patent: Sep. 3, 2024

(54) STATOR, ROTARY ELECTRIC MACHINE, DRIVE DEVICE, AND MOBILE UNIT

(71) Applicant: NIDEC CORPORATION, Kyoto (JP)

(72) Inventor: Atsushi Sugaya, Kyoto (JP)

(73) Assignee: NIDEC CORPORATION, Kyoto (JP)

(*) Notice: Subject to any disclaimer, the term of this patent is extended or adjusted under 35 U.S.C. 154(b) by 248 days.

(21) Appl. No.: 17/684,316

(22) Filed: Mar. 1, 2022

(65) Prior Publication Data
US 2022/0286000 A1 Sep. 8, 2022

(30) Foreign Application Priority Data

Mar. 8, 2021 (JP) .................................. 2021-036634

(51) Int. Cl.
*H02K 1/14* (2006.01)
*H02K 3/50* (2006.01)
*H02K 3/52* (2006.01)

(52) U.S. Cl.
CPC .............. *H02K 1/148* (2013.01); *H02K 3/50* (2013.01); *H02K 3/521* (2013.01)

(58) Field of Classification Search
CPC .......... H02K 1/16; H02K 1/148; H02K 1/185; H02K 3/251; H02K 3/50; H02K 3/521; H02K 5/203; H02K 9/19; H02K 2213/03; H02K 1/146
See application file for complete search history.

(56) References Cited

U.S. PATENT DOCUMENTS

| 2,928,932 A * | 3/1960 | Huggins ............... B23K 9/0035 |
| | | 219/137 R |
| 8,410,657 B2 * | 4/2013 | Utaka ..................... H02K 1/16 |
| | | 310/216.136 |
| 10,797,560 B1 * | 10/2020 | Siddiqui ................. F16B 4/004 |
| 11,114,921 B2 | 9/2021 | Ito et al. |

FOREIGN PATENT DOCUMENTS

| JP | 201011645 A | 1/2010 |
| JP | 2019106813 A | 6/2019 |

* cited by examiner

*Primary Examiner* — Thomas Truong
(74) *Attorney, Agent, or Firm* — HAUPTMAN HAM, LLP (57) ABSTRACT

A stator according to an aspect of the present invention includes a stator core having a core back in an annular shape surrounding a central axis of the stator, and a plurality of teeth extending radially inward from the core back. The stator core has a hole provided in a radially outer portion of the stator core, the hole extending in an axial direction, and a weld provided on a radially outer surface of the stator core. The weld includes a first weld provided on the radially outer surface of the stator core on a virtual line connecting the hole and the central axis as viewed in the axial direction.

15 Claims, 6 Drawing Sheets

STATOR, ROTARY ELECTRIC MACHINE, DRIVE DEVICE, AND MOBILE UNIT

CROSS-REFERENCE TO RELATED APPLICATIONS

The present invention claims priority under 35 U.S.C. § 119 to Japanese Patent Application No. 2021-036634 filed on Mar. 8, 2021, the entire content of which is incorporated herein by reference.

FIELD OF THE INVENTION

The present invention relates to a stator, a rotary electric machine, a drive device, and a mobile unit.

BACKGROUND

There is known a stator core that is fixed by a bolt inserted into a hole. For example, there is known a stator core used in an in-vehicle motor.

When a stator core is fixed with a bolt, a torsional force generated to tighten the bolt is applied to the stator core. This may deform the stator core. In particular, when the stator core is composed of a plurality of plate members stacked, the plate members may be deformed.

SUMMARY

A stator according to an aspect of the present invention includes a stator core having a core back in an annular shape surrounding a central axis of the stator, and a plurality of teeth extending radially inward from the core back. The stator core has a hole provided in a radially outer portion of the stator core, the hole extending in an axial direction, and a weld provided on a radially outer surface of the stator core. The weld includes a first weld provided on the radially outer surface of the stator core on a virtual line connecting the hole and the central axis as viewed in the axial direction.

A rotary electric machine according to an aspect of the present invention includes the stator described above and a rotor facing the stator across a gap.

A drive device according to an aspect of the present invention is mounted on a vehicle, and includes the rotary electric machine described above, and a transmission device that is connected to the rotary electric machine and transmits rotation of the rotary electric machine to an axle of the vehicle.

A mobile unit according to an aspect of the present invention includes the rotary electric machine described above.

The above and other elements, features, steps, characteristics and advantages of the present disclosure will become more apparent from the following detailed description of the preferred embodiments with reference to the attached drawings.

DETAILED DESCRIPTION

Figure 1:
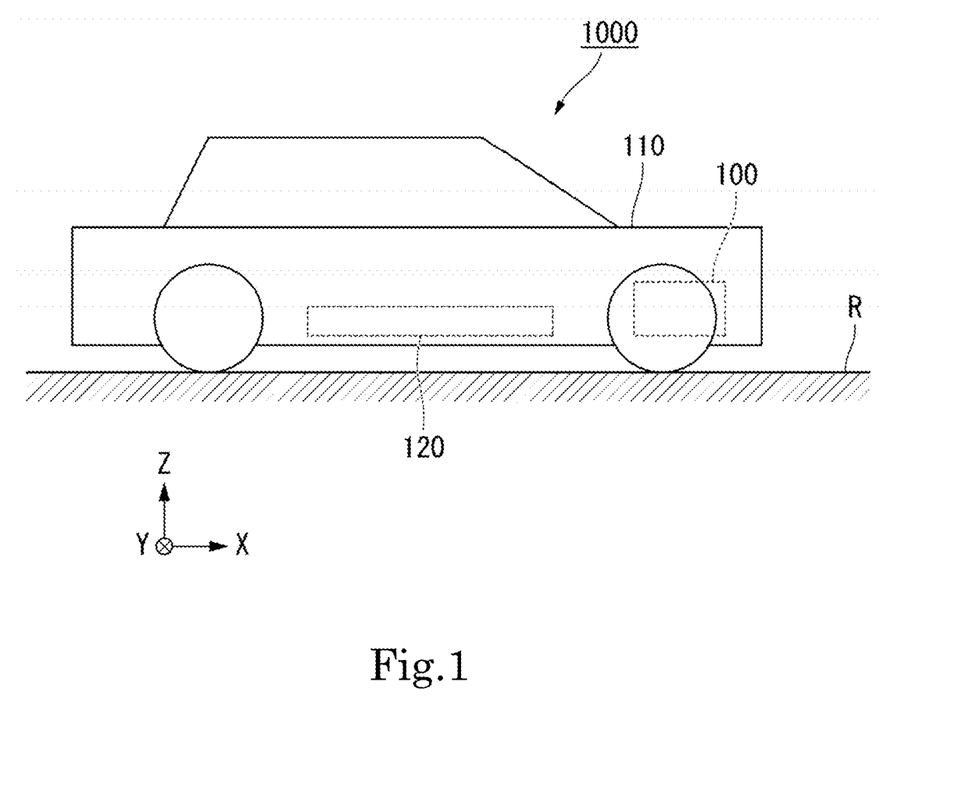
FIG. 1 illustrates a mobile unit according to a preferred embodiment.

As illustrated in FIG. 1, a mobile unit 1000 of the present embodiment is a vehicle powered by a motor such as a hybrid electric vehicle (HEV), a plug-in hybrid electric vehicle (PHV), and an electric vehicle (EV). The mobile unit 1000 includes a vehicle body 110, a drive device 100 for rotating wheels of the mobile unit 1000, and a battery 120 for supplying electric power to the drive device 100. The drive device 100 and the battery 120 are accommodated inside the vehicle body 110.

In the following description, a vertical direction is defined and described based on a positional relationship when the mobile unit 1000 including the drive device 100 is located on a horizontal road surface R. That is, a relative positional relationship with respect to the vertical direction described in the following embodiment needs to be satisfied at least when the mobile unit 1000 including the drive device 100 is located on the horizontal road surface R.

In the drawings, an XYZ coordinate system is illustrated appropriately as a three-dimensional orthogonal coordinate system. In the XYZ coordinate system, a Z-axis direction corresponds to the vertical direction. A +Z side is an upper side in the vertical direction, and a −Z side is a lower side in the vertical direction. In the following description, the upper side and the lower side in the vertical direction will be referred to simply as the "upper side" and the "lower side", respectively. An X-axis direction is a direction orthogonal to the Z-axis direction and is a front-rear direction of the mobile unit 1000 being a vehicle. In the preferred embodiment described below, a +X side corresponds to a front side in the mobile unit 1000, while a −X side corresponds to a rear side in the mobile unit 1000. A Y-axis direction is a direction orthogonal to both the X-axis direction and the Z-axis direction, and is a left-right direction of the mobile unit 1000, i.e., a vehicle lateral direction. In the following embodiments described below, a +Y side corresponds to a left side in the mobile unit 1000, and a −Y side corresponds to a right side in the mobile unit 1000. The front-rear direction and the left-right direction are each a horizontal direction orthogonal to the vertical direction.

The positional relationship in the front-rear direction is not limited to the positional relationship of the following embodiments, and the +X side may be the rear side of the mobile unit 1000 and the −X side may be the front side of the mobile unit 1000. In this case, the +Y side is the right side of the mobile unit 1000, and the −Y side is the left side of the mobile unit 1000. In the present specification, a "parallel direction" includes a substantially parallel direction, and an "orthogonal direction" includes a substantially orthogonal direction.

A central axis J illustrated in the drawings as appropriate is a virtual axis extending in a direction intersecting the vertical direction. More specifically, the central axis J extends in the Y-axis direction orthogonal to the vertical direction, i.e., in the left-right direction of the mobile unit 1000. In description below, unless otherwise particularly stated, a direction parallel to the central axis J is simply referred to as the "axial direction", a radial direction about the central axis J is simply referred to as the "radial direction", and a circumferential direction about the central axis J, i.e., a direction around the central axis J is simply referred to as the "circumferential direction". Then, the left side (+Y side) in the axial direction is referred to as a "first axial side", and the right side (−Y side) in the axial direction is referred to as a "second axial side".

An arrow θ appropriately illustrated in the drawing indicates the circumferential direction. In the following description, a side advancing clockwise about the central axis J as viewed from the right side in the circumferential direction, i.e., a side (+θ side) toward which the arrow θ faces is referred to as a "first circumferential side", and a side advancing counterclockwise about the central axis J as viewed from the right side in the circumferential direction, i.e., a side (−θ side) opposite to the side toward which the arrow θ faces is referred to as a "second circumferential side".

Figure 2:
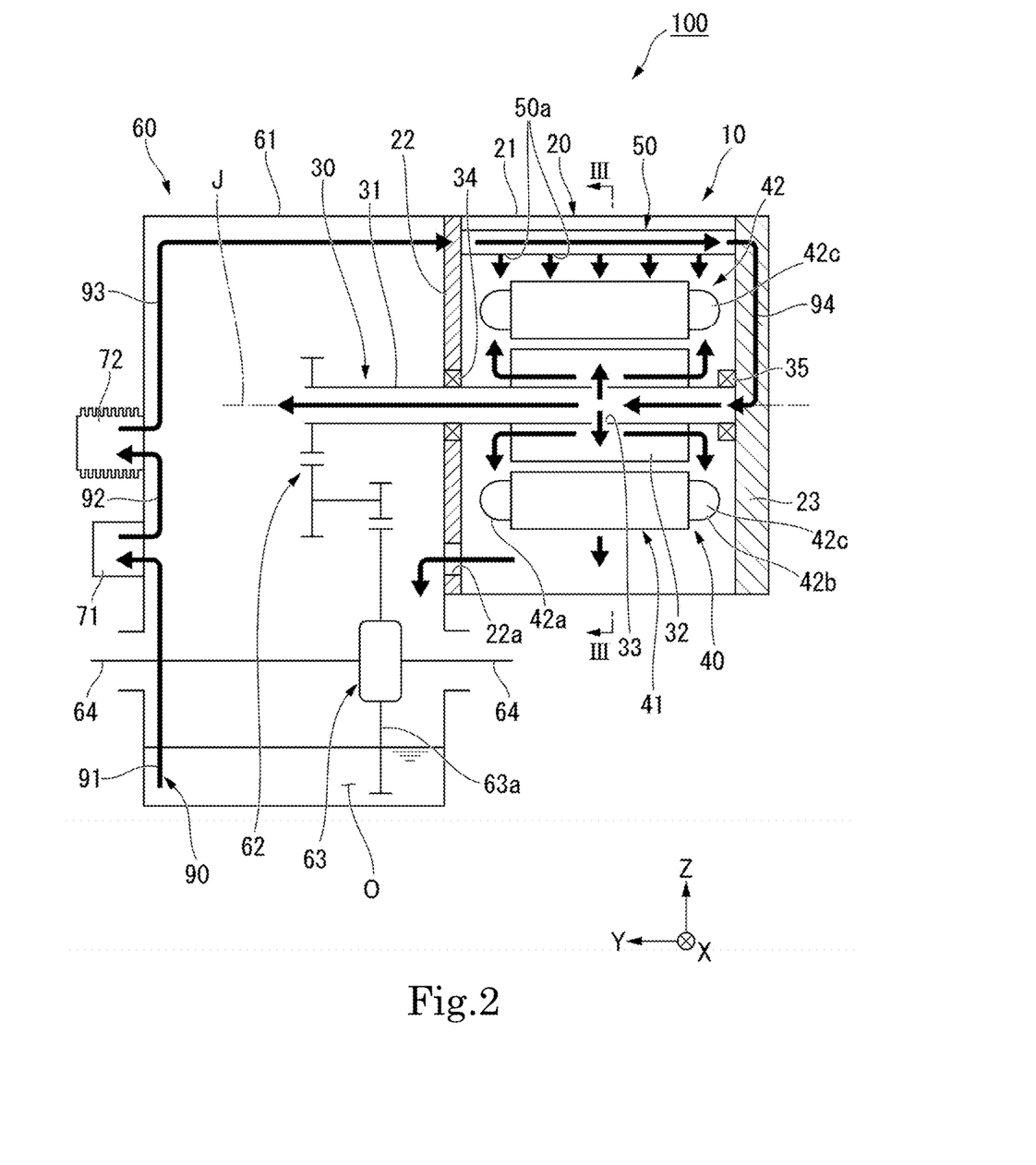
FIG. 2 is a schematic diagram schematically illustrating a drive device according to a preferred embodiment of the present invention.

The drive device 100 of the present preferred embodiment illustrated in FIG. 2 is mounted on the mobile unit 1000 being a vehicle to rotate an axle 64 of the mobile unit 1000. As illustrated in FIG. 2, the drive device 100 includes a rotary electric machine 10 and a transmission device 60. That is, the mobile unit 1000 includes the rotary electric machine 10 and the transmission device 60. The transmission device 60 is connected to the rotary electric machine 10, and transmits rotation of the rotary electric machine 10, i.e., rotation of a rotor 30 described later, to the axle 64 of the mobile unit 1000. The transmission device 60 of the present preferred embodiment includes a gear housing 61, a speed reducer 62 connected to the rotary electric machine 10, and a differential gear 63 connected to the speed reducer 62.

The gear housing 61 internally accommodates the speed reducer 62, the differential gear 63, and oil O. The oil O is stored in a lower region in the gear housing 61. The oil O circulates in a refrigerant flow path 90 described later. The oil O is used as a refrigerant for cooling the rotary electric machine 10. The oil O is also used as lubricating oil for the speed reducer 62 and the differential gear 63. As the oil O, for example, an oil equivalent to an automatic transmission fluid (ATF) having a relatively low viscosity is preferably used to function as a refrigerant and a lubricating oil.

The differential gear 63 includes a ring gear 63a. The ring gear 63a receives torque output from the rotary electric machine 10 and transmitted through the speed reducer 62. The ring gear 63a has a lower end portion immersed in the oil O stored in the gear housing 61. When the ring gear 63a rotates, the oil O is scraped up. The oil O scraped up is supplied to, for example, the speed reducer 62 and the differential gear 63 as a lubricating oil.

The rotary electric machine 10 drives the drive device 100. The rotary electric machine 10 is located, for example, on the second axial side from the transmission device 60. In the present preferred embodiment, the rotary electric machine 10 is a motor. The rotary electric machine 10 includes a motor housing 20, the rotor 30 rotatable about the central axis J, a stator 40, and a refrigerant feed part 50.

The motor housing 20 internally accommodates the rotor 30 and the stator 40. The motor housing 20 is connected to the gear housing 61 on the second axial side. The motor housing 20 has a peripheral wall 21, a partition wall 22, and a lid 23. The peripheral wall 21 and the partition wall 22 are each, for example, a part of a single member. The lid 23 is separate from, for example, the peripheral wall 21 and the partition wall 22.

The peripheral wall 21 has a cylindrical or substantially cylindrical shape that surrounds the central axis J and opens toward the second axial side. The partition wall 22 is connected to an end portion of the peripheral wall 21 on the first axial side. The partition wall 22 axially partitions the inside of the motor housing 20 and the inside of the gear housing 61. The partition wall 22 has a partition wall opening 22a that allows the inside of the motor housing 20 to communicate with the inside of the gear housing 61. The partition wall 22 holds a bearing 34. The lid 23 is fixed to an end portion of the peripheral wall 21 on the second axial side. The lid 23 closes the opening of the peripheral wall 21 on the second axial side. The lid 23 holds a bearing 35.

Figure 3:
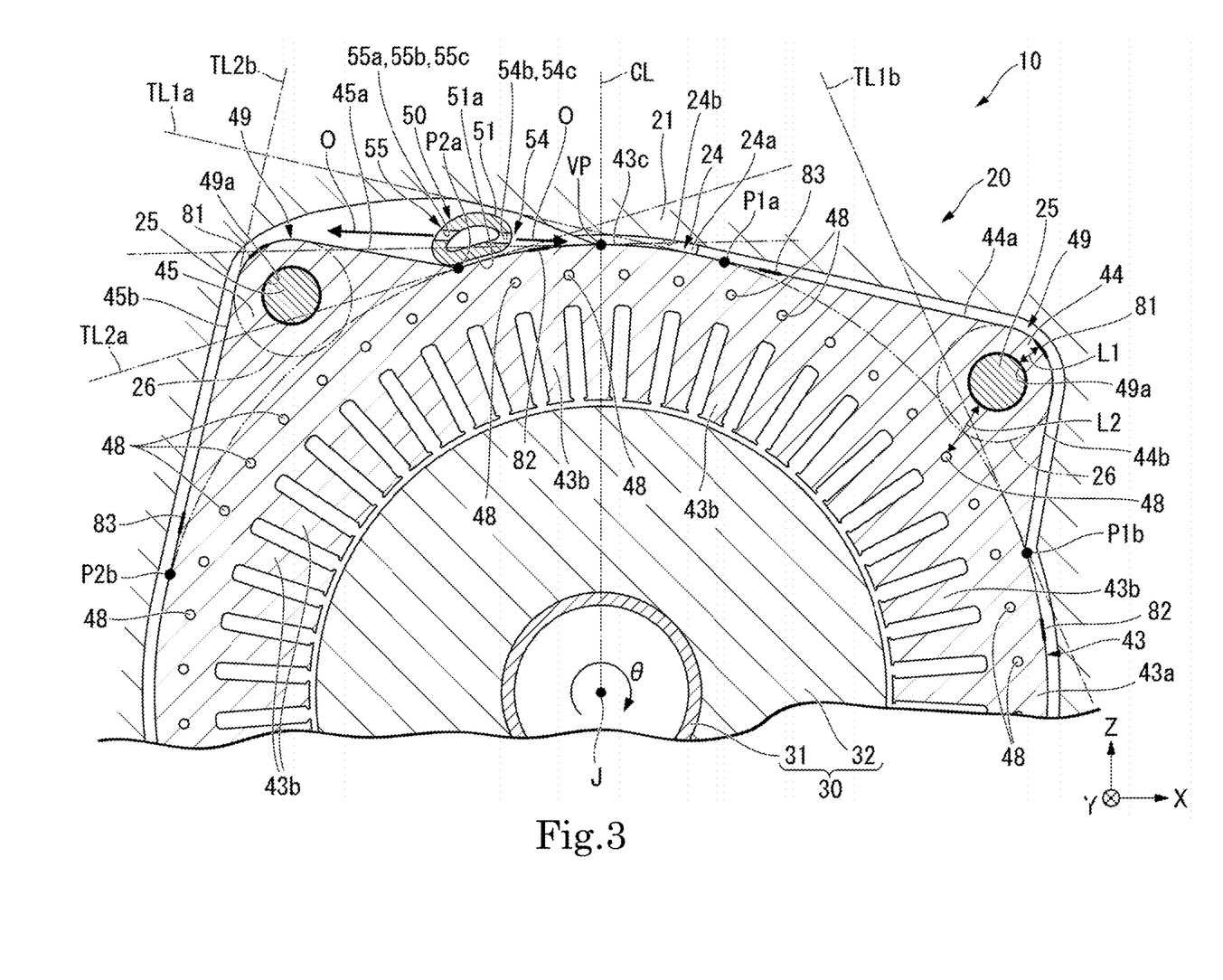
FIG. 3 is a sectional view illustrating a part of a drive device according to a preferred embodiment, and is a sectional view taken along line III-III in FIG. 2.

As illustrated in FIG. 3, the motor housing 20 has a support portion 24. The support portion 24 is provided on an inner peripheral surface of the peripheral wall 21. The support portion 24 protrudes radially inward. The support portion 24 has a radially inner surface that is an arcuate curved surface about the central axis J. The radially inner surface of the support portion 24 is in contact with an outer peripheral surface 43c of a stator core body 43 described later of the stator 40. This causes the support portion 24 to support the stator 40 from radially outward. The support portion 24 extends in the axial direction. Although not illustrated, support portions 24 are provided at intervals along the circumferential direction.

Figure 4:
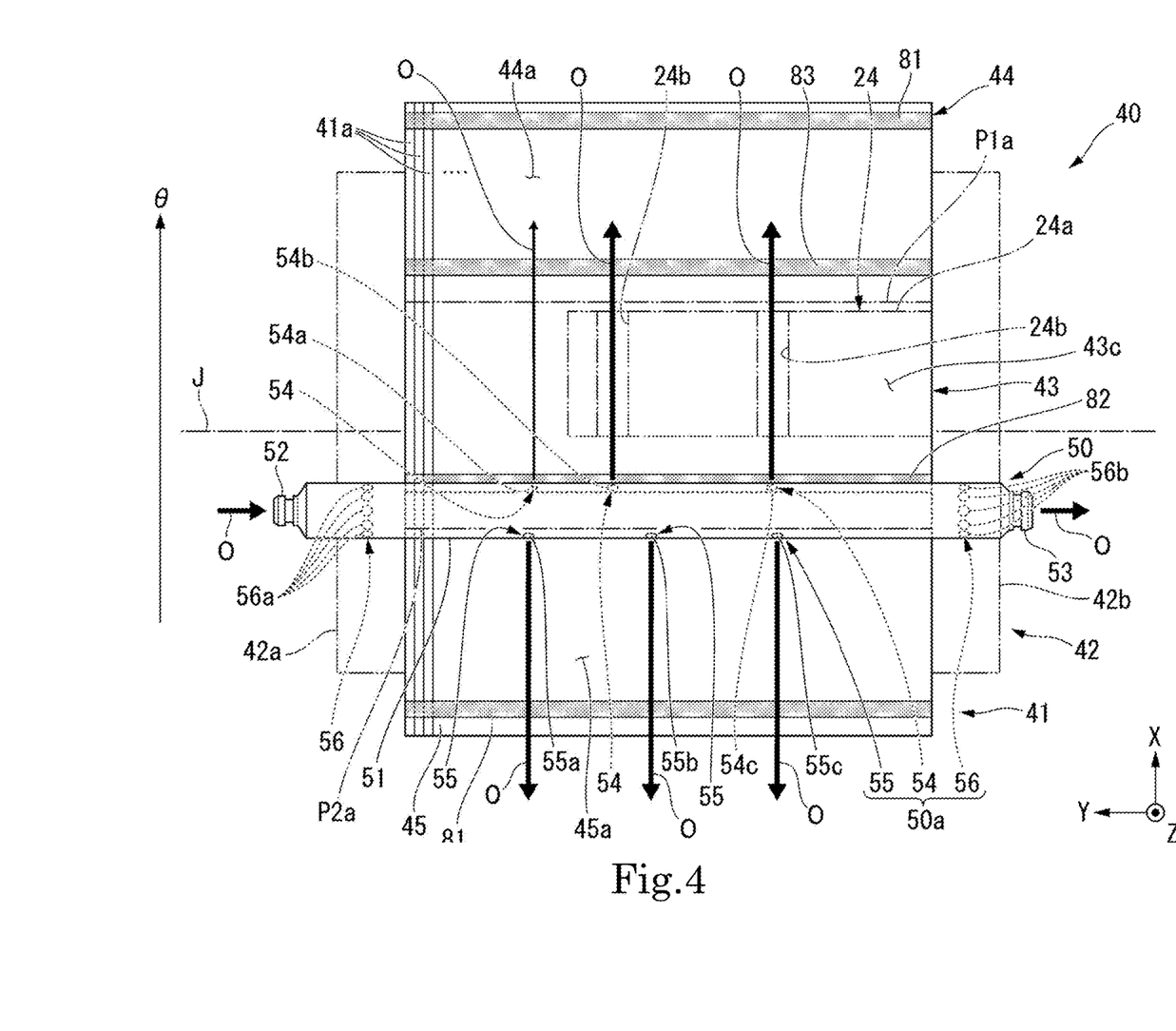
FIG. 4 illustrates a stator and a refrigerant feed part according to a preferred embodiment as viewed from above.

In the present preferred embodiment, the support portion 24 includes an opposed support portion 24a facing the refrigerant feed part 50 from the first circumferential side (+θ side). The opposed support portion 24a is located above the stator 40. The opposed support portion 24a protrudes downward. The opposed support portion 24a has a penetration groove 24b that passes through the opposed support portion 24a in the circumferential direction. The penetration groove 24b is recessed radially outward from a radially inner surface of the opposed support portion 24a. As illustrated in FIG. 4, penetration grooves 24b are provided at intervals in the axial direction in the present preferred embodiment. For example, two penetration grooves 24b are provided. The opposed support portion 24a has an end portion on the first axial side, the end portion being located on the second axial side from an end portion of the stator core body 43 described later on the first axial side. The motor housing 20 has an inner peripheral surface including a portion located on the first axial side of the opposed support portion 24a, the portion radially facing the outer peripheral surface 43c of the stator core body 43 across a gap.

As illustrated in FIG. 2, the rotor 30 faces the stator 40 across a gap. The rotor 30 includes a shaft 31 and a rotor body 32. Although not illustrated, the rotor body 32 includes a rotor core, and a rotor magnet fixed to the rotor core. Torque of the rotor 30 is transmitted to the transmission device 60.

The shaft 31 is rotatable about the central axis J. The shaft 31 is rotatably supported by the bearings 34 and 35. In the present preferred embodiment, the shaft 31 is a hollow shaft. The shaft 31 has a cylindrical or cylindrical shape about the central axis J and extends axially. The shaft 31 is provided with a hole 33 that allows the inside of the shaft 31 to communicate with the outside of the shaft 31. The shaft 31 extends across the inside of the motor housing 20 and the inside of the gear housing 61. The shaft 31 has an end portion on the first axial side that protrudes into the gear housing 61. The shaft 31 is connected at the end portion on the first axial side to the speed reducer 62.

The stator 40 radially faces the rotor 30 across a gap. More specifically, the stator 40 is located radially outward of the rotor 30. The stator 40 is fixed inside the motor housing 20. The stator 40 includes a stator core 41 and a coil assembly 42.

Figure 5:
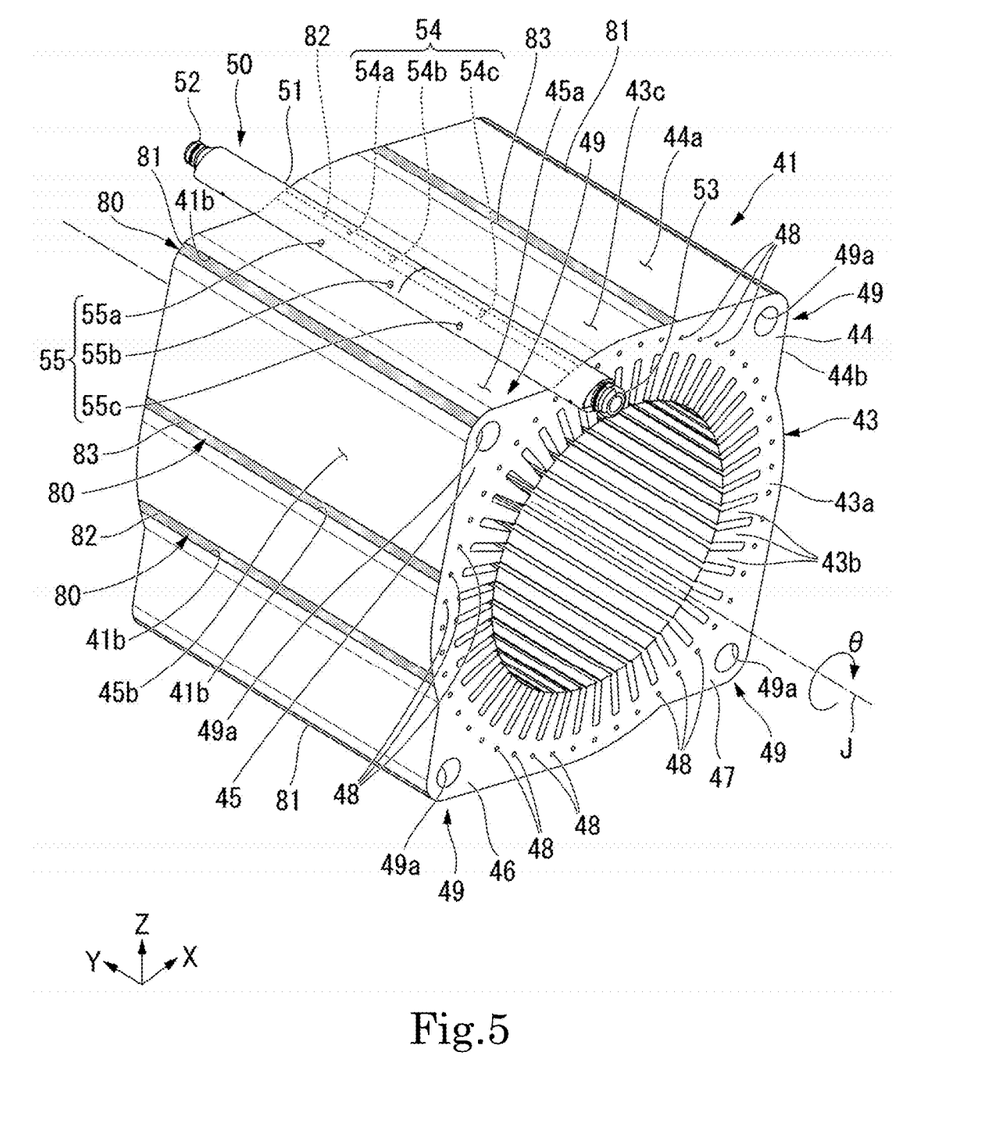
FIG. 5 is a perspective view illustrating a stator core and a refrigerant feed part according to a preferred embodiment.
Figure 6:
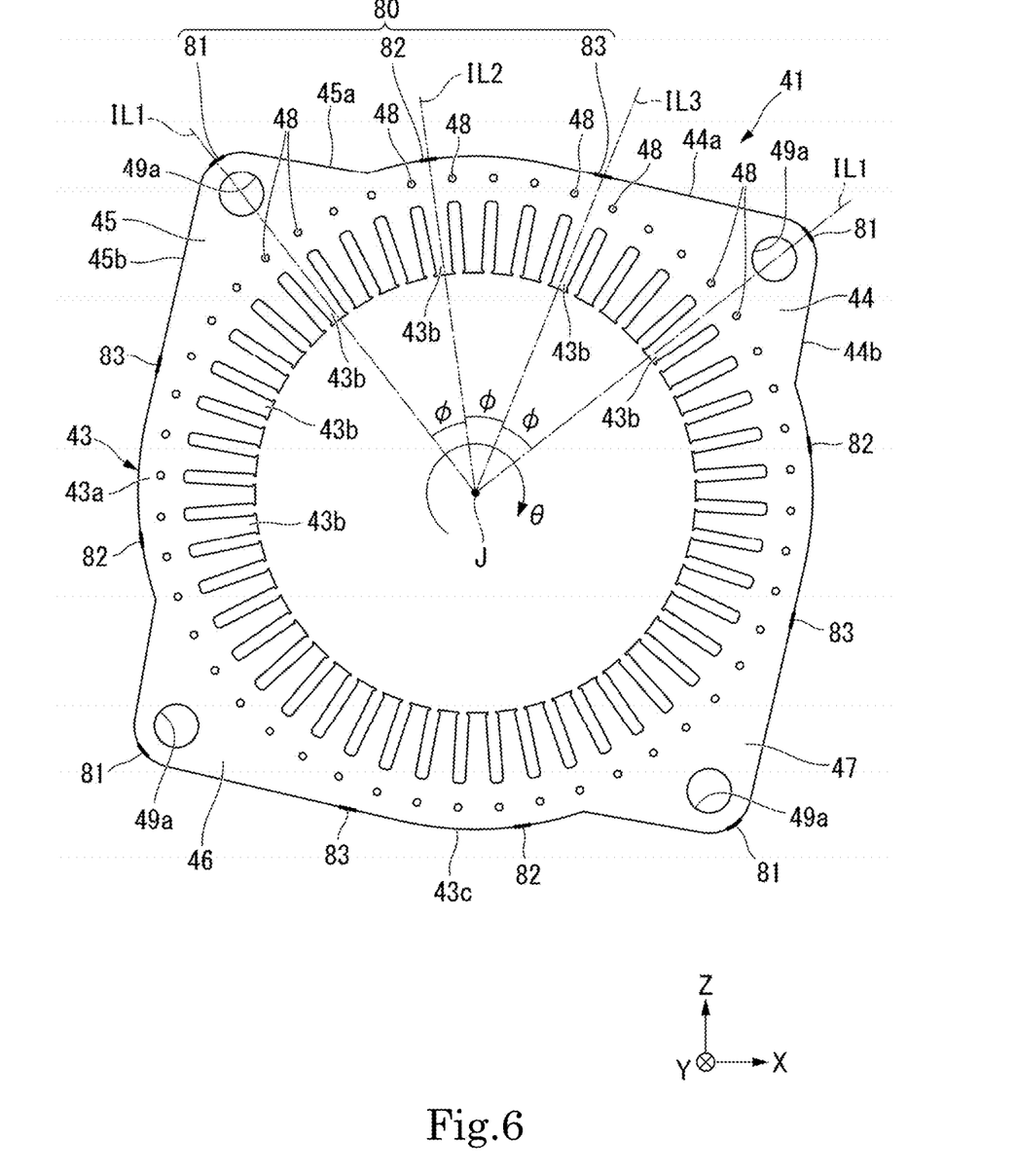
FIG. 6 illustrates a stator core according to a preferred embodiment as viewed from a second axial side.

The stator core 41 is in an annular shape surrounding the central axis J of the rotary electric machine 10. The stator core 41 is located radially outside the rotor 30. The stator core 41 surrounds the rotor 30. As illustrated in FIG. 4, the stator core 41 is composed of, for example, plate members 41a such as electromagnetic steel plates stacked in the axial direction. The plate members 41a adjacent to each other in the axial direction are, for example, partially crimped and fixed to each other. As illustrated in FIGS. 5 and 6, the stator core 41 in the present preferred embodiment has a shape with four-fold symmetry around the central axis J.

The stator core 41 includes a stator core body 43 and a protruding portion 49. The stator core body 43 is in an annular shape surrounding the rotor 30. More specifically, the stator core body 43 is in a cylindrical or substantially cylindrical shape about the central axis J, and opens on both sides in the axial direction. The stator core body 43 has the outer peripheral surface 43c in a cylindrical or substantially cylindrical shape surrounding the rotor 30. In the present preferred embodiment, the outer peripheral surface 43c has a cylindrical or substantially cylindrical shape about the central axis J. The outer peripheral surface 43c constitutes a part of an outer peripheral surface of the stator core 41. In the present preferred embodiment, the outer peripheral surface of the stator core 41, i.e., a radially outer surface of the stator core 41, is composed of the outer peripheral surface 43c and a radially outer surface of the protruding portion 49. As illustrated in FIG. 3, the outer peripheral surface 43c is supported from radially outside by the support portion 24 provided on the inner peripheral surface of the motor housing 20. The outer peripheral surface 43c is disposed radially facing a portion, which is provided with no support portion 24, of the inner peripheral surface of the motor housing 20 across a gap.

As illustrated in FIGS. 3, 5, and 6, the stator core body 43 includes a core back 43a in a cylindrical or substantially cylindrical shape extending axially and teeth 43b extending radially inward from the core back 43a. That is, the stator core 41 includes the core back 43a and the teeth 43b. The core back 43a is in an annular shape surrounding the central axis J. The core back 43a has an outer peripheral surface that is the outer peripheral surface 43c of the stator core body 43. That is, the core back 43a has the outer peripheral surface 43c in a cylindrical or substantially cylindrical shape. The teeth 43b are disposed at equal intervals over one circumference along the circumferential direction.

In the present preferred embodiment, the core back 43a has flux barrier portions 48 disposed at intervals in the circumferential direction. In the present specification, the term, "flux barrier portion", is a portion capable of preventing a flow of magnetic flux. That is, the magnetic flux is less likely to pass through the flux barrier portion. The flux barrier portion is not particularly limited as long as it can prevent a flow of magnetic flux, and may include a void or a non-magnetic portion such as a resin portion. In the present preferred embodiment, the flux barrier portions 48 are each a void portion composed of a hole axially passing through the core back 43a. The hole constituting each of the flux barrier portions 48 is a circular hole, for example.

The flux barrier portions 48 are disposed at equal intervals over one circumference along the circumferential direction. The flux barrier portions 48 are disposed radially outside respective slot portions provided between the corresponding teeth 43b adjacent to each other in the circumferential direction. The flux barrier portions 48 each have an inner diameter equal to or less than a distance between the teeth 43b adjacent to each other in the circumferential direction, i.e., a dimension of each of the slot portions in the circumferential direction. The flux barrier portions 48 in the present preferred embodiment are located at the center between an inner peripheral surface and the outer peripheral surface 43c of the core back 43a in the radial direction.

The protruding portion 49 protrudes radially outward from the outer peripheral surface 43c of the core back 43a. The protruding portion 49 is a fixing portion fixed to the motor housing 20. As illustrated in FIG. 5, the protruding portion 49 extends axially. The protruding portion 49 extends from, for example, an end portion of the stator core body 43 on the first axial side to an end portion of the stator core body 43 on the second axial side. Multiple protruding portions 49 are provided at intervals in the circumferential direction. For example, four protruding portions 49 are provided.

The protruding portions 49 includes a first protruding portion 44, a second protruding portion 45, a third protruding portion 46, and a fourth protruding portion 47. The first protruding portion 44, the second protruding portion 45, the third protruding portion 46, and the fourth protruding portion 47 are disposed apart from each other in the circumferential direction. In the present preferred embodiment, the first protruding portion 44 and the second protruding portion 45 are located above the central axis J. In the present preferred embodiment, the third protruding portion 46 and the fourth protruding portion 47 are located below the central axis J. The first protruding portion 44, the second protruding portion 45, the third protruding portion 46, and the fourth protruding portion 47 are disposed at equal intervals over one circumference in the circumferential direction, for example. The first protruding portion 44, the second protruding portion 45, the third protruding portion 46, and the fourth protruding portion 47 are identical in shape to each other, for example. Thus, the following description may not include description of shape of the protruding portions 49 other than the first protruding portion 44. In the present preferred embodiment, each protruding portion 49 has an asymmetrical shape in the circumferential direction.

The first protruding portion 44 is provided in an upper front end portion of the stator core body 43. The first protruding portion 44 protrudes upward and diagonally forward from the stator core body 43. The second protruding portion 45 is provided in an upper rear end portion of the stator core body 43. The second protruding portion 45 protrudes upward and diagonally rearward from the stator core body 43. The third protruding portion 46 is provided in a lower rear end portion of the stator core body 43. The third protruding portion 46 protrudes downward and diagonally rearward from the stator core body 43. The fourth protruding portion 47 is provided in a lower front end portion of the stator core body 43. The fourth protruding portion 47 protrudes downward and diagonally forward from the stator core body 43.

As illustrated in FIG. 3, the first protruding portion 44 is located on the first circumferential side (+θ side) from the refrigerant feed part 50. The first protruding portion 44 is located on the first circumferential side from the opposed support portion 24a. In the present preferred embodiment, the first protruding portion 44 is located on the first circumferential side from a vertex VP on an upper side of the stator core body 43. The vertex VP is located uppermost in the outer peripheral surface 43c of the stator core body 43. As viewed in the axial direction, the vertex VP is an intersection at which the outer peripheral surface 43c of the stator core body 43 intersects with a virtual line CL extending in the vertical direction through the central axis J. The vertex VP is supported from above by the opposed support portion 24a, for example. In the present preferred embodiment, the first protruding portion 44 has a radially outer end portion that is located below the vertex VP.

The first protruding portion 44 is disposed away from the inner peripheral surface of the motor housing 20. The first protruding portion 44 decreases in circumferential dimension radially outward. The radially outer end portion of the first protruding portion 44 has an outline in an arc shape that is convex radially outward as viewed in the axial direction. The first protruding portion 44 has a first side surface 44a directed toward the second circumferential side (−θ side) is an inclined surface inclined toward the first circumferential side (+θ side) from the outer peripheral surface 43c of the stator core body 43 radially outward. That is, the first protruding portion 44 has the first side surface 44a as an inclined surface extending radially outward and toward the first circumferential side from the outer peripheral surface 43c of the core back 43a. In the present preferred embodiment, the first side surface 44a faces upward and diagonally forward.

The first side surface 44a has a radially inner end portion that is connected to the outer peripheral surface 43c of the stator core body 43, i.e., the outer peripheral surface 43c of the core back 43a. As viewed in the axial direction of the central axis J, the first side surface 44a extends along a tangent line TL1a tangent to a connection portion P1a at which the radially inner end portion of the first side surface 44a is connected to the outer peripheral surface 43c of the core back 43a. In the present preferred embodiment, the connection portion P1a is located forward and downward from the vertex VP. The tangent line TL1a inclines at an angle with respect to the front-back direction (X-axis direction) as viewed in the axial direction. The tangent line TL1a is located more downward toward the front side.

The first side surface 44a is smoothly connected to the outer peripheral surface 43c of the stator core body 43. The first side surface 44a extends linearly, for example, as viewed in the axial direction. The first side surface 44a extends forward and diagonally downward from the connection portion P1a as viewed in the axial direction. In the present preferred embodiment, the first side surface 44a is located more downward with distance from a first feed port 54 described later in the circumferential direction. The first side surface 44a is located more downward toward the front side of the mobile unit 1000 on which the drive device 100 is mounted.

The first protruding portion 44 has a second side surface 44b directed toward the first circumferential side (+θ side), and the second side surface 44b is an inclined surface inclined toward the second circumferential side (−θ side) from the outer peripheral surface 43c of the stator core body 43 radially outward. In the present preferred embodiment, the second side surface 44b faces forward and diagonally downward.

The second side surface 44b is connected at its radially inner end portion to the outer peripheral surface 43c of the stator core body 43. As viewed in the axial direction of the central axis J, the second side surface 44b extends in a direction inclined radially outward from a tangent line TL1b tangent to a connection portion P1b at which the radially inner end portion of the second side surface 44b is connected to the outer peripheral surface 43c of the stator core body 43.

In the present preferred embodiment, the connection portion P1b is located forward and downward from the connection portion P1a. The tangent line TL1b inclines at an angle with respect to the front-back direction as viewed in the axial direction. The tangent line TL1b is located more downward toward the front side. The tangent line TL1b inclines more in the front-back direction than the tangent line TL1a in the front-back direction.

The second side surface 44b is smoothly connected to the outer peripheral surface 43c of the stator core body 43. The second side surface 44b extends linearly, for example, as viewed in the axial direction. The second side surface 44b extends upward and diagonally forward from the connection portion P1b as viewed in the axial direction.

The second protruding portion 45 is located on the second circumferential side (−θ side) from the refrigerant feed part 50. The second protruding portion 45 is located on the second circumferential side from the opposed support portion 24a. In the present preferred embodiment, the second protruding portion 45 is located on the second circumferential side from the vertex VP on the upper side of the stator core body 43. In the present preferred embodiment, the second protruding portion 45 has a radial outer end portion that is located above the radially outer end portion of the first protruding portion 44. The second protruding portion 45 has an upper end portion that is located above the vertex VP, for example.

The second protruding portion 45 has a third side surface 45a directed toward the first circumferential side (+θ side), and the third side surface 45a is an inclined surface inclined toward the second circumferential side (−θ side) from the outer peripheral surface 43c of the stator core body 43 radially outward. In the present preferred embodiment, the third side surface 45a faces upward and diagonally forward.

The third side surface 45a is connected at its radially inner end portion to the outer peripheral surface 43c of the stator core body 43. As viewed in the axial direction of the central axis J, the third side surface 45a extends in a direction inclined radially outward from a tangent line TL2a tangent to a connection portion P2a at which the radially inner end portion of the third side surface 45a is connected to the outer peripheral surface 43c of the stator core body 43. In the present preferred embodiment, the connection portion P2a is located rearward and downward from the vertex VP. The tangent line TL2a inclines at an angle with respect to the front-back direction as viewed in the axial direction. The tangent line TL2a is located more upward toward the front side.

The third side surface 45a is smoothly connected to the outer peripheral surface 43c of the stator core body 43. The third side surface 45a extends linearly, for example, as viewed in the axial direction. The third side surface 45a extends rearward and diagonally upward from the connection portion P2a as viewed in the axial direction.

The second protruding portion 45 has a fourth side surface 45b directed toward the second circumferential side (−θ side), and the fourth side surface 45b is an inclined surface inclined toward the first circumferential side (+θ side) from the outer peripheral surface 43c of the stator core body 43 radially outward. That is, the second protruding portion 45 has the fourth side surface 45b as an inclined surface extending radially outward and toward the first circumferential side from the outer peripheral surface 43c of the core back 43a. In the present preferred embodiment, the fourth side surface 45b faces rearward and diagonally upward.

The fourth side surface 45b has a radially inner end portion that is connected to the outer peripheral surface 43c of the stator core body 43, i.e., the outer peripheral surface 43c of the core back 43a. As viewed in the axial direction of the central axis J, the fourth side surface 45b extends along a tangent line TL2b tangent to a connection portion P2b at which the radially inner end portion of the fourth side surface 45b is connected to the outer peripheral surface 43c of the stator core body 43. In the present preferred embodiment, the connection portion P2b is located rearward and downward from the connection portion P2a. The tangent line TL2b inclines at an angle with respect to the front-back direction as viewed in the axial direction. The tangent line TL2b is located more upward toward the front side. The tangent line TL2b inclines more in the front-back direction than the tangent line TL2a in the front-back direction.

The fourth side surface 45b is smoothly connected to the outer peripheral surface 43c of the stator core body 43. The fourth side surface 45b extends linearly, for example, as viewed in the axial direction. The fourth side surface 45b extends upward and diagonally forward from the connection portion P2b as viewed in the axial direction.

The stator core 41 has a hole 49a provided in a radially outer portion of the stator core 41. The radially outer portion of the stator core 41 is located radially outside the center of the stator core 41 in the radial direction. The radially outer portion of the stator core 41 includes, for example, the core back 43a and the protruding portion 49. In the present preferred embodiment, the hole 49a is provided in the protruding portion 49. One hole 49a is provided for each protruding portion 49.

The hole 49a extends in the axial direction. In the present preferred embodiment, the hole 49a is a through-hole passing through the protruding portion 49 in the axial direction. The hole 49a is, for example, a circular hole. Through the hole 49a, a bolt 25 extending in the axial direction passes. Although not illustrated, the bolt 25 is allowed to pass through the hole 49a from the second axial side (−Y side) and is tightened into a female screw hole provided in the motor housing 20. As a result, the protruding portion 49 is fixed to the motor housing 20 by the bolt 25. Between the protruding portion 49 and the bolt 25, a washer 26 is provided. The washer 26 is in a plate or substantially plate shape with a plate surface directed in the axial direction, and is in an annular shape surrounding the bolt 25.

As illustrated in FIG. 5, the stator core 41 has a weld 80 provided on the radially outer surface of the stator core 41. In the present preferred embodiment, the weld 80 extends in the axial direction. More specifically, the weld 80 extends from an end portion of the stator core 41 on the first axial side to an end portion thereof on the second axial side. The weld 80 is formed by welding a part of the radially outer surface of the stator core 41. In the present preferred embodiment, the weld 80 is formed by welding a groove bottom surface of a weld groove 41b provided in the radially outer surface of the stator core 41.

The weld groove 41b is recessed radially inward from the radially outer surface of the stator core 41. The weld groove 41b extends in the axial direction. More specifically, the weld groove 41b extends from the end portion of the stator core 41 on the first axial side to the end thereof on the second axial side. The weld groove 41b is open on both sides in the axial direction. The groove bottom surface of the weld groove 41b is an inner surface of the weld groove 41b, facing radially outside. The weld 80 is formed by a welding method that is not particularly limited, and that may be arc welding or laser welding. The weld 80 is provided over the plate members 41a to fix the plate members 41a to each other. In the present preferred embodiment, multiple welds 80 are provided.

The multiple welds 80 are disposed at intervals along the circumferential direction. As illustrated in FIG. 6, the multiple welds 80 are disposed at equal angles along the circumferential direction in the present preferred embodiment. That is, a circumferential angle φ between the welds 80 adjacent to each other in the circumferential direction on the radially outer surface of the stator core 41 is identical in all the welds 80. In the present preferred embodiment, twelve welds 80 are provided. The twelve welds 80 are provided at respective positions that divide the radially outer surface of the stator core 41 into twelve equal parts in the circumferential direction. In the present preferred embodiment, the angle φ is 30°.

The multiple welds 80 are disposed on the radially outer surface of the stator core 41 in a rotationally symmetrical manner around the central axis J. In the present preferred embodiment, the multiple welds 80 are disposed on the radially outer surface of the stator core 41 with four-fold symmetry around the central axis J. That is, when the stator core 41 is rotated by 90° around the central axis J, each of the welds 80 in the stator core 41 after rotation overlaps the corresponding one of the welds 80 in the stator core 41 before rotation. In the present preferred embodiment, the multiple welds 80 include a first weld 81, a second weld 82, and a third weld 83.

The first weld 81 is a weld 80 provided on a virtual line IL1 connecting the hole 49a and the central axis J as viewed in the axial direction on the radially outer surface of the stator core 41. The virtual line IL1 extends radially through the center of the hole 49a and the central axis J as viewed in the axial direction. In the present preferred embodiment, the virtual line IL1 passes through the circumferential center of one tooth 43b and the circumferential center between the flux barrier portions 48 adjacent to each other in the circumferential direction as viewed in the axial direction. In the present preferred embodiment, the first weld 81 is provided on the radially outer surface of the protruding portion 49. More specifically, the first weld 81 is provided on the radially outer surface of a radially outer end portion of the protruding portion 49. The first weld 81 is located radially outside the hole 49a.

In the present preferred embodiment, multiple first welds 81 are provided. One first weld 81 is provided for each of the first protruding portion 44, the second protruding portion 45, the third protruding portion 46, and the fourth protruding portion 47. That is, four first welds 81 are provided in total in the present preferred embodiment.

As illustrated in FIG. 3, a distance L2 between the flux barrier portion 48 and the hole 49a is larger than a distance L1 between the first weld 81 and the hole 49a as viewed in the axial direction. The distance L1 is the shortest distance between the first weld 81 and the hole 49a in the protruding portion 49 provided with the first weld 81. The distance L1 is a radial distance between the first weld 81 and the hole 49a. The distance L2 is the shortest distance between the hole 49a and the flux barrier portion 48 closest to the hole 49a. The distance L2 is, for example, twice or more the distance L1.

The second weld 82 is a weld 80 provided on the outer peripheral surface 43c of the core back 43a. As illustrated in FIG. 6, multiple second welds 82 are provided in the present preferred embodiment. The second welds 82 are each provided at a portion of the outer peripheral surface 43c located between the protruding portions 49 adjacent to each other in the circumferential direction. More specifically, the second welds 82 are provided respective portions including: a portion of the outer peripheral surface 43c located between the first protruding portion 44 and the second protruding portion 45 in the circumferential direction; a portion of the outer peripheral surface 43c located between the second protruding portion 45 and the third protruding portion 46 in the circumferential direction; a portion of the outer peripheral surface 43c located between the third protruding portion 46 and the fourth protruding portion 47 in the circumferential direction; and a portion of the outer peripheral surface 43c located between the fourth protruding portion 47 and the first protruding portion 44 in the circumferential direction. That is, four second welds 82 are provided in total in the present preferred embodiment.

Each of the second welds 82 is disposed between the protruding portions 49 and disposed closer to the protruding portion 49 on the second circumferential side (−θ side). For example, the second weld 82 provided in the portion of the outer peripheral surface 43c located between the first protruding portion 44 and the second protruding portion 45 in the circumferential direction is provided at a position closer to the third side surface 45a than to the first side surface 44a in the circumferential direction. As illustrated in FIG. 3, the second weld 82 provided in the portion of the outer peripheral surface 43c located between the first protruding portion 44 and the second protruding portion 45 in the circumferential direction is located on the second circumferential side from the vertex VP.

In the present preferred embodiment, the second weld 82 is located radially outside a portion of the core back 43a located between the flux barrier portions 48 adjacent to each other in the circumferential direction. The second weld 82 is located radially outside one tooth 43b. As illustrated in FIG. 6, a virtual line IL2 connecting the second weld 82 and the central axis J passes through the circumferential center of one tooth 43b and the circumferential center between the flux barrier portions 48 adjacent to each other in the circumferential direction as viewed in the axial direction.

The third weld 83 is a weld 80 provided on a portion of the radially outer surface of the protruding portion 49, the portion being different in circumferential position from the hole 49a. In the present preferred embodiment, multiple third welds 83 are provided. One third weld 83 is provided for each of the first protruding portion 44, the second protruding portion 45, the third protruding portion 46, and the fourth protruding portion 47. That is, four third welds 83 are provided in total in the present preferred embodiment.

The third weld 83 is provided on a side surface of each protruding portion 49 facing the second circumferential side (−θ side). More specifically, the third weld 83 is provided in a circumferential end portion of the side surface of each protruding portion 49 facing the second circumferential side, the circumferential end portion being on a side (−θ side) close to the outer peripheral surface 43c of the core back 43a. The first protruding portion 44 has a side surface directed to the second circumferential side that is the first side surface 44a as an inclined surface. The second protruding portion 45 has a side surface directed to the second circumferential side that is the fourth side surface 45b as an inclined surface.

In the present preferred embodiment, the third weld 83 is located radially outside a portion of the core back 43a located between the flux barrier portions 48 adjacent to each other in the circumferential direction. The third weld 83 is located radially outside one tooth 43b. As viewed in the axial direction, a virtual line IL3 connecting the third weld 83 and the central axis J passes through the circumferential center of one tooth 43b and the circumferential center between the flux barrier portions 48 adjacent to each other in the circumferential direction.

The first weld 81, the second weld 82, and the third weld 83 are alternately disposed in this order on the radially outer surface of the stator core 41 toward the first circumferential side (+θ side). In the present preferred embodiment, the second weld 82 and the third weld 83 are each provided one by one on an upper surface, a front surface side (on +X side), a lower surface, and a rear surface (on −X side) of the stator core 41. The first weld 81 is provided in each of boundary portions including: a boundary portion between the front surface and the upper surface of the stator core 41; a boundary portion between the upper surface and the rear surface of the stator core 41; a boundary portion between the rear surface and the lower side of the stator core 41; and a boundary portion between the lower surface and the front surface of the stator core 41. In the present preferred embodiment, the first weld 81 is located radially outside the second weld 82 and the third weld 83.

As illustrated in FIG. 2, the coil assembly 42 includes multiple coils 42c attached to the stator core 41 along the circumferential direction. The multiple coils 42c are mounted on the respective teeth 43b of the stator core 41 with respective insulators (not illustrated) interposed therebetween. The multiple coils 42c are disposed along the circumferential direction. More specifically, the multiple coils 42c are disposed at equal intervals along the circumferential direction. Although not illustrated, the coil assembly 42 may have a binding member or the like for binding each of the coils 42c, or may have a jump wire connecting the coils 42c to each other.

The coil assembly 42 includes coil ends 42a and 42b that protrude axially from the stator core 41. The coil end 42a protrudes from the stator core 41 toward the first axial side. The coil end 42b protrudes from the stator core 41 toward the second axial side. The coil end 42a includes a portion of each of the coils 42c included in the coil assembly 42, the portion protruding from the stator core 41 toward the first axial side. The coil end 42b includes a portion of each of the coils 42c included in the coil assembly 42, the portion protruding from the stator core 41 toward the second axial side. In the present preferred embodiment, the coil ends 42a and 42b are each in an annular or substantially annular shape about the central axis J. Although not illustrated, the coil ends 42a and 42b each may have a binding member or the like for binding each of the coils 42c, or may have a jump wire connecting the coils 42c to each other.

In the present preferred embodiment, the refrigerant feed part 50 is in a tubular shape extending in the axial direction. In other words, the refrigerant feed part 50 is a pipe extending in the axial direction in the present preferred embodiment. The refrigerant feed part 50 has axially opposite end portions supported by the motor housing 20. The refrigerant feed part 50 has the end portion on the first axial side that is supported by, for example, the partition wall 22. The refrigerant feed part 50 has the end portion on the second axial side that is supported by, for example, the lid 23. The refrigerant feed part 50 is located radially outside the stator 40. In the present preferred embodiment, the refrigerant feed part 50 is located above the stator 40.

As illustrated in FIG. 3, the refrigerant feed part 50 is located between the first protruding portion 44 and the second protruding portion 45 in the circumferential direction. The refrigerant feed part 50 is located between the opposed support portion 24a and the second protruding portion 45 in the circumferential direction. In the present preferred embodiment, the refrigerant feed part 50 is disposed at a position closer to the second protruding portion 45 than to the first protruding portion 44 in the circumferential direction. The refrigerant feed part 50 is located, for example, above a boundary portion between the second protruding portion 45 and the stator core body 43. The refrigerant feed part 50 is located above the connection portion P2a. As viewed in the vertical direction, the refrigerant feed part 50 is disposed overlapping an end portion of the third side surface 45a of the second protruding portion 45 on the first circumferential side (+θ side) and the outer peripheral surface 43c of the stator core body 43. As illustrated in FIG. 5, the refrigerant feed part 50 includes a wide portion 51, an inlet portion 52, and an outlet portion 53.

As illustrated in FIG. 4, the entire refrigerant feed part 50 excluding the inlet portion 52 and the outlet portion 53 is the wide portion 51 in the present preferred embodiment. In the present preferred embodiment, the wide portion 51 is a body portion of the refrigerant feed part 50. A placement relationship between the wide portion 51 and the stator core 41 is similar to a placement relationship between the refrigerant feed part 50 and the stator core 41 described above. The wide portion 51 is located radially outside the stator 40. In the present preferred embodiment, the wide portion 51 is located above the stator 40. The wide portion 51 is located between the opposed support portion 24a and the second protruding portion 45 in the circumferential direction.

The wide portion 51 has an axial dimension that is larger than an axial dimension of the stator core 41. The wide portion 51 protrudes on both sides in the axial direction from the stator core 41. The wide portion 51 is disposed over an upper side of the stator core 41 and an upper side of the coil ends 42a and 42b. The wide portion 51 includes a portion that protrudes from the stator core 41 toward the first axial side and that is located above the coil end 42a. The wide portion 51 includes a portion that protrudes from the stator core 41 toward the second axial side and that is located above the coil end 42b.

The wide portion 51 has a circumferential dimension that is larger than its radial dimension. As illustrated in FIG. 3, the wide portion 51 is, for example, in a shape in which a cylinder is crushed in the radial direction, i.e., a substantially elliptical tubular shape flat in the radial direction. The wide portion 51 has a radially inner surface that is a facing surface 51a facing the outer peripheral surface of the stator core 41 in the radial direction. The facing surface 51a faces the outer peripheral surface 43c of the stator core body 43 in the radial direction. The facing surface 51a is in a shape along the outer peripheral surface of the stator core 41, i.e., a shape along the outer peripheral surface 43c of the stator core body 43 in the present preferred embodiment. The facing surface 51a is a curved surface that is concave radially outward. As viewed in the axial direction, the facing surface 51a is in an arc shape centered on the central axis J, the arc shape being convex radially outward. A radial gap between the facing surface 51a and the outer peripheral surface 43c is, for example, smaller than a radial depth of the penetration groove 24b.

As illustrated in FIG. 4, the inlet portion 52 is connected to an end portion of the wide portion 51 on the first axial side. The inlet portion 52 is in a cylindrical or substantially cylindrical shape that opens toward the first axial side. The inlet portion 52 is an end portion of the refrigerant feed part 50 on the first axial side. The inlet portion 52 is, for example, fitted into a hole (not illustrated) provided in the partition wall 22 and supported by the partition wall 22. From the inlet portion 52, oil O flows into the inside of the refrigerant feed part 50.

The outlet portion 53 is connected to an end portion of the wide portion 51 on the second axial side. The outlet portion 53 is in a cylindrical or substantially cylindrical shape that opens toward the second axial side. The outlet portion 53 is an end portion of the refrigerant feed part 50 on the second axial side. The outlet portion 53 is, for example, fitted into a hole (not illustrated) provided in the lid 23 and supported by the lid 23. From the outlet portion 53, the oil O having flowed into the inside of the refrigerant feed part 50 from the inlet portion 52 partially flows out. In the present preferred embodiment, the oil O in the refrigerant feed part 50 flows in a direction from the first axial side toward the second axial side. That is, the oil O in the refrigerant feed part 50 flows in the direction in which the first axial side is an upstream side and the second axial side is a downstream side.

The refrigerant feed part 50 has a feed port 50a for feeding the oil O as a refrigerant to the stator 40. In the present preferred embodiment, the feed port 50a is an injection port that injects partially the oil O having flowed into the refrigerant feed part 50 to the outside of the refrigerant feed part 50. Multiple feed ports 50a are provided. In the present preferred embodiment, all the feed ports 50a are provided in the wide portion 51. That is, the wide portion 51 has at least one feed port 50a.

The feed port 50a is composed of a hole passing through a wall portion of the refrigerant feed part 50 in a tubular or substantially tubular shape from an inner peripheral surface to an outer peripheral surface of the wall portion. The feed port 50a is an opening of the hole that passes through the wall portion of the refrigerant feed part 50 in a tubular or substantially tubular shape from the inner peripheral surface to the outer peripheral surface of the wall portion, the opening being open in the outer peripheral surface of the refrigerant feed part 50. The feed port 50a is, for example, in a circular or substantially circular shape. The feed port 50a provided in the wide portion 51 in the present preferred embodiment includes a first feed port 54, a second feed port 55, and a third feed port 56.

The first feed port 54 is a feed port 50a for feeding the oil O as a refrigerant to the stator core 41. The first feed port 54 is a feed port 50a that opens toward the first circumferential side (+θ side). As illustrated in FIG. 3, the first feed port 54 is located on the second circumferential side (−θ side) from the vertex VP of the stator core body 43 in the present preferred embodiment. The first feed port 54 is located above the stator core body 43. The opposed support portion 24a and the first protruding portion 44 are located on the first circumferential side from the first feed port 54.

The first feed port 54 is provided in a radially inward portion in an end portion of the wide portion 51 on the first circumferential side (+θ side). In the present preferred embodiment, the first feed port 54 opens in a direction inclined radially inward with respect to the circumferential direction. As illustrated in FIG. 4, multiple first feed ports 54 are provided in the present preferred embodiment. The first feed port 54 includes, for example, three first feed ports 54a, 54b, and 54c.

The first feed port 54a, the first feed port 54b, and the first feed port 54c are disposed side by side at an interval in this order from the first axial side toward the second axial side. The first feed ports 54a and 54b are located on the first axial side from the axial center of the stator core 41. The first feed port 54c is located on the second axial side from the axial center of the stator core 41. An axial distance between the first feed port 54a and the first feed port 54b is smaller than an axial distance between the first feed port 54b and the first feed port 54c.

The first feed port 54a is located on the first axial side from the opposed support portion 24a. That is, the first feed port 54a is a first feed port 54 disposed at a position different from the opposed support portion 24a in the axial direction of the central axis J in the present preferred embodiment. The first feed port 54a has an inner diameter smaller than an inner diameter of each of the other first feed ports 54b and 54c.

The first feed ports 54b and 54c are identical in axial position to the corresponding two penetration grooves 24b provided in the opposed support portion 24a. As illustrated in FIG. 3, the first feed ports 54b and 54c are each a first feed port 54 that opens toward a penetration groove 24b. In the present specification, the text, "a first feed port opens toward a penetration groove", means that only at least a part of the first feed port need to overlap the inside of the penetration groove as viewed in a direction in which the first feed port opens. In the present preferred embodiment, the first feed ports 54b and 54c overlap the inside of the corresponding penetration grooves 24b and the outer peripheral surface 43c of the stator core body 43 as viewed in the direction in which the first feed ports 54b and 54c open. The direction in which the first feed port 54 opens is, for example, a direction in which a hole constituting the first feed port 54 passes through a wall of the refrigerant feed part 50 from an inner peripheral surface to an outer peripheral surface of the wall.

The oil O to be discharged from the first feed ports 54b and 54c is injected in the direction in which the first feed ports 54b and 54c open, and is fed to the outer peripheral surface 43c of the stator core body 43. The oil O fed from the first feed ports 54b and 54c to the outer peripheral surface 43c flows on the outer peripheral surface 43c toward the first circumferential side (+θ side) and passes through the corresponding penetration grooves 24b in the circumferential direction. The oil O having passed through the penetration grooves 24b flows from the outer peripheral surface 43c to the first side surface 44a of the first protruding portion 44, and flows over the first protruding portion 44 toward the first circumferential side. The oil O having flowed over the first protruding portion 44 flows downward between the second side surface 44b and the inner peripheral surface of the motor housing 20, and is fed to a front side portion of the outer peripheral surface 43c of the stator core body 43.

The second feed port 55 is a feed port 50a for feeding the oil O as a refrigerant to the stator core 41. The second feed port 55 is a feed port 50a that opens toward the second circumferential side (−θ side). In the present preferred embodiment, the second feed port 55 is located on the second circumferential side from the vertex VP of the stator core body 43. The second feed port 55 is located above the stator core body 43. The second protruding portion 45 is located on the second circumferential side from the second feed port 55. The second feed port 55 is located above an end portion of the second protruding portion 45 on the first circumferential side (+θ side).

The second feed port 55 is provided in a radially outward portion in an end portion of the wide portion 51 on the second circumferential side (−θ side). In the present preferred embodiment, the second feed port 55 opens in a direction inclined radially outward with respect to the circumferential direction. As viewed in the direction in which the second feed port 55 opens, the second feed port 55 overlaps a portion of the inner peripheral surface of the motor housing 20, the portion being disposed facing an upper side of the second protruding portion 45. The direction in which the second feed port 55 opens is, for example, a direction in which a hole constituting the second feed port 55 passes through the wall of the refrigerant feed part 50 from the inner peripheral surface to the outer peripheral surface of the wall. As illustrated in FIG. 4, multiple second feed ports 55 are provided in the present preferred embodiment. The second feed port 55 includes, for example, three second feed ports 55a, 55b, and 55c.

The second feed port 55a, the second feed port 55b, and the second feed port 55c are disposed side by side at an interval in this order from the first axial side toward the second axial side. The second feed port 55a is located on the first axial side from the axial center of the stator core 41. The second feed port 55b is located at an axial position that is substantially identical to the axial center of the stator core 41. The second feed port 55c is located on the second axial side from the axial center of the stator core 41. An axial distance between the second feed port 55a and the second feed port 55b is, for example, equal to an axial distance between the second feed port 55b and the second feed port 55c. The second feed ports 55a, 55b, and 55c each have an equal inner diameter, for example. The inner diameter of each of the second feed ports 55a, 55b, and 55c is, for example, equal to the inner diameter of each of the first feed ports 54b and 54c.

The oil O to be discharged from the second feed port 55 is injected in the direction in which the second feed port 55 opens, and is fed to a portion of the inner peripheral surface of the motor housing 20, the portion being located above the second protruding portion 45. The oil O fed from the second feed port 55 to the inner peripheral surface of the motor housing 20 flows along the inner peripheral surface of the motor housing 20 toward the second circumferential side (−θ side), and then flows over the second protruding portion 45 toward the second circumferential side. The oil O having flowed over the second protruding portion 45 flows downward between fourth side surface 45b and the inner peripheral surface of the motor housing 20, and is fed to a rear side portion of the outer peripheral surface 43c of the stator core body 43.

In the present preferred embodiment, the first feed port 54 and the second feed port 55 are disposed by being displaced from each other in the axial direction of the central axis J. For example, the first feed port 54a is disposed by being slightly displaced from the second feed port 55a toward the second axial side. For example, the first feed port 54b is disposed by being relatively largely displaced from the second feed port 55b toward the first axial side. The first feed port 54c is disposed by being slightly displaced from the second feed port 55c toward the first axial side.

The text, "the first feed port and the second feed port are disposed by being displaced from each other in the axial direction", in the present specification, means that the first feed port and the second feed port may be partially disposed at an identical axial position as long as the center of the first feed port and the center of the second feed port are disposed by being displaced from each other in the axial direction. In the present preferred embodiment, the first feed port 54a and the second feed port 55a are partially disposed at an identical axial position. The first feed port 54c and the second feed port 55c are partially disposed at an identical axial position. The first feed port 54b and the second feed port 55b are disposed by being displaced from each other in the axial direction as a whole.

The third feed port 56 is a feed port 50a for feeding the oil O as a refrigerant to the coil ends 42a and 42b. The third feed port 56 opens downward. The third feed port 56 includes a third feed port 56a disposed above the coil end 42a and a third feed port 56b disposed above the coil end 42b. The third feed port 56a is located on the first axial side from the first feed port 54 and the second feed port 55. The third feed port 56b is located on the second axial side from the first feed port 54 and the second feed port 55. For example, multiple third feed ports 56a and multiple third feed ports 56b are provided. For example, five third feed ports 56a and five third feed ports 56b are provided. The five third feed ports 56a are disposed at intervals around the wide portion 51. The five third feed ports 56b are also disposed at intervals around the wide portion 51.

As illustrated in FIG. 2, the drive device 100 in the present preferred embodiment is provided with the refrigerant flow path 90 through which the oil O as a refrigerant circulates. The refrigerant flow path 90 is provided throughout from the inside of the motor housing 20 to the inside of the gear housing 61. The refrigerant flow path 90 allows the oil O stored in the gear housing 61 to be fed to the rotary electric machine 10 and to return to the inside of the gear housing 61 again. The refrigerant flow path 90 is provided with a pump 71, a cooler 72, and the refrigerant feed part 50. The refrigerant flow path 90 includes a first flow path portion 91, a second flow path portion 92, a third flow path portion 93, and a fourth flow path portion 94.

The first flow path portion 91, the second flow path portion 92, and the third flow path portion 93 are each provided, for example, in a wall of the gear housing 61. The fourth flow path portion 94 is provided, for example, in the lid 23. The first flow path portion 91 allows a portion with the oil O stored, inside the gear housing 61, to communicate with the pump 71. The second flow path portion 92 allows the pump 71 to communicate with the cooler 72. The third flow path portion 93 allows the cooler 72 to communicate with the inside of the refrigerant feed part 50. In the present preferred embodiment, the third flow path portion 93 communicates with the end portion of the refrigerant feed part 50 on the first axial side. The fourth flow path portion 94 allows the inside of the refrigerant feed part 50 to communicate with the inside of the shaft 31. In the present preferred embodiment, the fourth flow path portion 94 communicates with the end portion of the refrigerant feed part 50 on the second axial side and an end portion of the shaft 31 on the second axial side.

When the pump 71 is driven, the oil O stored in the gear housing 61 is sucked up through the first flow path portion 91 and flows into the cooler 72 through the second flow path portion 92. The oil O having flowed into the cooler 72 is cooled in the cooler 72, and then flows through the third flow path portion 93 to the inside of the refrigerant feed part 50. The oil O having flowed into the refrigerant feed part 50 is partially injected from the feed port 50a and fed to the stator 40. In the present preferred embodiment, the oil O injected from the first feed port 54 and the second feed port 55 is fed to the stator core 41. The oil O injected from the third feed port 56 is fed to the coil ends 42a and 42b. The oil O having flowed into the refrigerant feed part 50 also partially flows into the inside of the shaft 31 through the fourth flow path portion 94. The oil O having flowed into the shaft 31 partially passes through the inside of the rotor body 32 from the hole 33 and scatters to the stator 40. The oil O having flowed into the shaft 31 is also partially discharged into the gear housing 61 from an opening of the shaft 31 on the first axial side, and is stored in the gear housing 61 again.

The oil O fed to the stator 40 from the feed port 50a and the oil O fed to the stator 40 from the inside of the shaft 31 take heat from the stator 40. The oil O having cooled the stator 40 falls downward to accumulate in a lower region in the motor housing 20. The oil O accumulated in the lower region in the motor housing 20 returns to the inside of the gear housing 61 through the partition wall opening 22a provided in the partition wall 22. As described above, the refrigerant flow path 90 allows the oil O stored in the gear housing 61 to be fed to the rotor 30 and the stator 40.

According to the present preferred embodiment, the weld 80 provided on the radially outer surface of the stator core 41 includes the first weld 81 provided on the virtual line IL1 connecting the hole 49a and the central axis J as viewed in the axial direction on the radially outer surface of the stator core 41. Thus, the first weld 81 can increase strength in a portion of the stator core 41 near the hole 49a. This enables preventing the portion of the stator core 41 near the hole 49a from being deformed when the bolt 25 having passed through the hole 49a is tightened. In particular, when the stator core 41 is composed of plate members 41a stacked in the axial direction as in the present preferred embodiment, the first weld 81 can firmly fix the plate members 41a to each other in the portion of the stator core 41 near the hole 49a. This enables suppressing deformation of the plate members 41a that are each relatively thin. As described above, the present preferred embodiment enables suppressing deformation of the stator core 41.

The first weld 81 is provided outside the hole 49a, which is provided in the radially outer portion of the stator core 41, in the radial direction about the central axis J. Thus, the first weld 81 can be disposed at a position relatively far from the rotor 30. This enables magnetic flux flowing between the stator core 41 and the rotor 30 to be less likely to pass through the first weld 81. Thus, influence of the first weld 81 on the magnetic flux flowing between the stator core 41 and the rotor 30 can be suppressed. This enables suppressing deterioration of magnetic characteristics of the rotary electric machine 10 even when the first weld 81 is provided. As a result, providing the first weld 81 enables suppressing the deformation of the stator core 41 while suppressing decrease in output of the rotary electric machine 10.

According to the present preferred embodiment, the hole 49a is provided in the protruding portion 49. The first weld 81 is provided on the radially outer surface of the protruding portion 49. Thus, influence of the hole 49a and the first weld 81 on the magnetic flux flowing between the stator core 41 and the rotor 30 can be more suppressed as compared with when the hole 49a and the first weld 81 are provided in the core back 43a. This enables further suppressing the deterioration of the magnetic characteristics of the rotary electric machine 10. Thus, the decrease in output of the rotary electric machine 10 can be further suppressed.

According to the present preferred embodiment, the distance L2 between the flux barrier portion 48 provided in the core back 43a and the hole 49a is larger than the distance L1 between the first weld 81 and the hole 49a as viewed in the axial direction. Thus, the hole 49a and the first weld 81 each can be suitably disposed away from the core back 43a in a radially outward direction. This enables further suppressing the influence of the hole 49a and the first weld 81 on the magnetic flux flowing between the stator core 41 and the rotor 30. Thus, the deterioration of the magnetic characteristics of the rotary electric machine 10 can be further suppressed. This enables further suppressing the decrease in output of the rotary electric machine 10.

According to the present preferred embodiment, the weld 80 includes the second weld 82 provided on the outer peripheral surface 43c of the core back 43a. Thus, the second weld 82 can further increase strength of the stator core 41. The second weld 82 also can more firmly fix the plate members 41*a* to each other. Thus, the deformation of the stator core 41 can be further suppressed.

According to the present preferred embodiment, the second weld 82 is located radially outside a portion of the core back 43*a* located between the flux barrier portions 48 adjacent to each other in the circumferential direction. Thus, a distance between the radially outer surface of the stator core 41 and the flux barrier portion 48 in the radial direction, and a distance between the flux barrier portion 48 and the second weld 82, tend to be easily increased as compared with when the second weld 82 is located radially outside the flux barrier portion 48. This facilitates securing a magnetic path, through which the magnetic flux flows, between the radially outer surface of the stator core 41 and the flux barrier portion 48 in the radial direction, and between the flux barrier portion 48 and the second weld 82. Thus, influence of the second weld 82 on the magnetic flux flowing through the core back 43*a* tends to be easily suppressed. This enables suppressing the deterioration of the magnetic characteristics of the rotary electric machine 10 even when the second weld 82 is provided. Thus, providing the second weld 82 enables further suppressing the deformation of the stator core 41 while suppressing the decrease in output of the rotary electric machine 10.

According to the present preferred embodiment, the second weld 82 is located radially outside the teeth 43*b*. Here, the magnetic flux flowing from the teeth 43*b* to the core back 43*a* flows, for example, radially outward in the teeth 43*b*, and flows separately on both sides in the circumferential direction in the core back 43*a*. In this case, the magnetic flux is less likely to flow to a portion located radially outside the teeth 43*b* in the radially outer surface of the stator core 41. Thus, providing the second weld 82 radially outside the teeth 43*b* enables further suppressing the influence of the second weld 82 on the magnetic flux flowing through the core back 43*a*. This enables further suppressing the deterioration of the magnetic characteristics of the rotary electric machine 10.

According to the present preferred embodiment, the weld 80 includes the third weld 83 provided on a portion of the radially outer surface of the protruding portion 49, the portion being different in circumferential position from the hole 49*a*. Thus, the third weld 83 can further increase strength of the stator core 41. The third weld 83 also can more firmly fix the plate members 41*a* to each other. Thus, the deformation of the stator core 41 can be further suppressed.

According to the present preferred embodiment, the third weld 83 is provided in a circumferential end portion of the first side surface 44*a* as an inclined surface, the circumferential end portion being on the side (−θ side) close to the outer peripheral surface 43*c* of the core back 43*a*. Here, the first side surface 44*a* as an inclined surface extends along the tangent line TL1*a* tangent to the connection portion P1*a* at which the radially inner end portion of the first side surface 44*a* is connected to the outer peripheral surface 43*c* of the core back 43*a*. Thus, the circumferential end portion of the first side surface 44*a* on the side close to the outer peripheral surface 43*c* of the core back 43*a* tends to be easily disposed at a position away from the hole 49*a* in the circumferential direction as compared with when the first side surface 44*a* has a shape as in the second side surface 44*b*. Providing the third weld 83 in the circumferential end portion of the first side surface 44*a* on the side close to the outer peripheral surface 43*c* enables the third weld 83 to be disposed away from the first weld 81 to some extent in the circumferential direction. This allows the first weld 81 and the third weld 83 to facilitate reinforcing the radially outer surface of the stator core 41 over a relatively wide range. Thus, the deformation of the stator core 41 can be further suppressed. When the second weld 82 is provided, the third weld 83 tends to be easily provided in an intermediate portion between the first weld 81 and the second weld 82 in the circumferential direction. This allows the first weld 81, the second weld 82, and the third weld 83 to facilitate reinforcing the radially outer surface of the stator core 41 suitably over a wider range. Thus, the deformation of the stator core 41 can be suppressed more suitably. The same applies to the third weld 83 provided on the fourth side surface 45*b* of the second protruding portion 45, the third weld 83 provided on a side surface of the third protruding portion 46 on the second circumferential side, and the third weld 83 provided on a side surface of the fourth protruding portion 47 on the second circumferential side.

According to the present preferred embodiment, the third weld 83 is located radially outside a portion of the core back 43*a* located between the flux barrier portions 48 adjacent to each other in the circumferential direction. Thus, a distance between the radially outer surface of the stator core 41 and the flux barrier portion 48 in the radial direction, and a distance between the flux barrier portion 48 and the third weld 83, tend to be easily increased as compared with when the third weld 83 is located radially outside the flux barrier portion 48. This facilitates securing a magnetic path, through which the magnetic flux flows, between the radially outer surface of the stator core 41 and the flux barrier portion 48 in the radial direction, and between the flux barrier portion 48 and the third weld 83. Thus, influence of the third weld 83 on the magnetic flux flowing through the core back 43*a* tends to be easily suppressed. This enables suppressing the deterioration of the magnetic characteristics of the rotary electric machine 10 even when the third weld 83 is provided. Thus, providing the third weld 83 enables further suppressing the deformation of the stator core 41 while suppressing the decrease in output of the rotary electric machine 10.

According to the present preferred embodiment, the third weld 83 is located radially outside the teeth 43*b*. Thus, the influence of the third weld 83 on the magnetic flux flowing through the core back 43*a* can be further suppressed as in the second weld 82 described above. This enables further suppressing the deterioration of the magnetic characteristics of the rotary electric machine 10.

According to the present preferred embodiment, the multiple welds 80 are disposed on the radially outer surface of the stator core 41 in a rotationally symmetrical manner around the central axis J. Thus, the multiple welds 80 can reinforce the radially outer surface of the stator core 41 in a well-balanced manner over the entire circumference. This enables further suppressing the deformation of the stator core 41. Even when the multiple welds 80 are provided, the stator core 41 can be prevented from being unbalanced in mass in the circumferential direction.

According to the present preferred embodiment, the multiple welds 80 are disposed at equal angles along the circumferential direction. Thus, the multiple welds 80 can reinforce the radially outer surface of the stator core 41 in a well-balanced manner over the entire circumference more suitably. This enables suppressing the deformation of the stator core 41 more suitably. Even when the multiple welds 80 are provided, the stator core 41 can be prevented from being unbalanced in mass in the circumferential direction more suitably.

According to the present preferred embodiment, the weld 80 extends in the axial direction. Thus, a portion of the stator core 41 reinforced by the weld 80 can be enlarged in the axial direction. This enables the strength of the stator core 41 to be further increased by the weld 80. The weld 80 also can suitably fix the plate members 41a stacked in the axial direction.

The present invention is not limited to the above-described preferred embodiment, and other structures and other methods may be employed within the scope of the technical idea of the present invention. As long as the weld includes the first weld, the weld may not include at least one of the second and third welds, or may include a fourth weld different from the second weld and the third weld. The second weld may be provided at any position on the outer peripheral surface of the core back. The third weld may be provided at any portion on the radially outer surface of the protruding portion, the portion being different in circumferential position from the hole. The weld is not particularly limited in shape.

The multiple welds may be disposed on the radially outer surface of the stator core with rotational symmetry other than four-fold symmetry around the central axis. When N is an integer of 2 or more, the multiple welds may be disposed on the radially outer surface of the stator core with N-fold symmetry around the central axis. The multiple welds may not be disposed on the radially outer surface of the stator core with rotational symmetry around the central axis. The multiple welds may not be disposed at equal angles along the circumferential direction. The weld is not particularly limited in number as long as the number is one or more. The weld 80 does not need to extend from the end portion of the stator core 41 on the first axial side to the end portion thereof on the second axial side. For example, the multiple welds may be provided side by side in the axial direction. The weld 80 may be provided only at each of the end portion of the stator core 41 on the first axial side and the end portion thereof on the second axial side.

The hole may be provided in the core back. In this case, the first weld may be provided on the outer peripheral surface of the core back. In this case, the stator core may not have a protruding portion. The hole may be any hole extending in the axial direction. The hole may have a bottom at an end in the axial direction. In this case, the hole may be a screw hole into which a bolt for fixing the stator core is tightened. The hole is not particularly limited in number as long as the number is one or more. The protruding portion of the stator core may have any shape. The flux barrier portions are not particularly limited in number and shape. The flux barrier portions may not be provided.

The rotary electric machine to which the present invention is applied is not limited to a motor, and may be a generator. The rotary electric machine is not limited in application. The rotary electric machine may be mounted on a mobile unit for uses other than rotating an axle, or may be mounted on an apparatus other than the mobile unit. The rotary electric machine is not particularly limited in attitude when being used. The rotary electric machine may have the central axis extending in the vertical direction. The mobile unit on which the rotary electric machine is mounted is not limited to a vehicle, and may be a flying unit or a ship. The mobile unit may be a manned mobile unit or an unmanned mobile unit. The structures and methods described above in the present specification can be appropriately combined within a range consistent with each other.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A stator comprising:
   a stator core including:
   a core back in an annular shape surrounding a central axis of the stator; and
   a plurality of teeth extending radially inward from the core back,
   the stator core having:
   a hole provided in a radially outer portion of the stator core, the hole extending in an axial direction; and
   a weld provided on a radially outer surface of the stator core, and
   the weld including a first weld provided on the radially outer surface of the stator core on a virtual line connecting the hole and the central axis as viewed in the axial direction, wherein
   the core back has an outer peripheral surface in a cylindrical shape,
   the stator core has a protruding portion that protrudes radially outward from an outer peripheral surface of the core back,
   the hole is provided in the protruding portion, and
   the first weld is provided on a radially outer surface of the protruding portion.

2. The stator according to claim 1, wherein
   the core back has a flux barrier portion, and
   as viewed in the axial direction, a distance between the flux barrier portion and the hole is larger than a distance between the first weld and the hole.

3. The stator according to claim 1, wherein the weld includes a second weld provided on the outer peripheral surface of the core back.

4. The stator according to claim 3, wherein
   the core back has a plurality of the flux barrier portions disposed at intervals in the circumferential direction, and
   the second weld is located radially outside a portion of the core back, the portion being located between the flux barrier portions adjacent to each other in the circumferential direction.

5. The stator according to claim 3, wherein the second weld is located radially outside the plurality of teeth.

6. The stator according to claim 1, wherein the weld includes a third weld provided on a portion of the radially outer surface of the protruding portion, the portion being different in circumferential position from the hole.

7. The stator according to claim 6, wherein
   the protruding portion has an inclined surface extending radially outward from an outer peripheral surface of the core back and toward a first circumferential side,
   the inclined surface extends along a tangent line tangent to a connection portion at which a radially inner end portion of the inclined surface is connected of the outer peripheral surface of the core back as viewed in the axial direction, and
   the third weld is provided in a circumferential end portion of the inclined surface on a side close to the outer peripheral surface of the core back.

8. The stator according to claim 6, wherein
the core back has a plurality of the flux barrier portions disposed at intervals in the circumferential direction, and
the third weld is located radially outside a portion of the core back, the portion being located between the flux barrier portions adjacent to each other in the circumferential direction.

9. The stator according to claim 6, wherein the third weld is located radially outside the plurality of teeth.

10. The stator according to claim 1, wherein
welds including the weld are provided, and
the welds are disposed on the radially outer surface of the stator core in a rotationally symmetrical manner around the central axis.

11. The stator according to claim 10, wherein the welds are disposed at equal angles along the circumferential direction.

12. The stator according to claim 1, wherein the weld extends in the axial direction.

13. A rotary electric machine comprising:
the stator according to claim 1; and
a rotor facing the stator across a gap.

14. A drive device mounted on a vehicle, the drive device comprising:
the rotary electric machine according to claim 13; and
a transmission device connected to the rotary electric machine to transmit rotation of the rotary electric machine to an axle of the vehicle.

15. A mobile unit comprising:
the rotary electric machine according to claim 13.

* * * * *